United States Patent [19]

Walczak et al.

[11] Patent Number: 5,907,418
[45] Date of Patent: May 25, 1999

[54] APPARATUS FOR INFRARED CHANNEL AND METHOD THEREFOR

[75] Inventors: Thomas J. Walczak, Woodstock; Rachid Alameh, Schaumburg; Sheila M. Rader, Wildwood, all of Ill.

[73] Assignee: Motorola, Inc., Schaumburg, Ill.

[21] Appl. No.: 08/513,037

[22] Filed: Aug. 9, 1995

[51] Int. Cl.$^6$ .................................................. H04B 10/00
[52] U.S. Cl. ......................... 359/142; 359/149; 359/172; 455/38.3; 379/59; 379/379
[58] Field of Search .................................... 359/145, 146, 359/149, 152, 172; 455/38.3, 127, 343, 56.1, 57.1; 348/61, 58; 379/59, 379

[56] References Cited

U.S. PATENT DOCUMENTS

| | | | |
|---|---|---|---|
| 4,523,332 | 6/1985 | Mori . | |
| 4,649,385 | 3/1987 | Aires et al. . | |
| 4,878,726 | 11/1989 | Fatehi | 350/96.15 |
| 4,990,892 | 2/1991 | Guest et al. | 340/573 |
| 5,123,014 | 6/1992 | Federkins et al. | 370/110.1 |
| 5,138,649 | 8/1992 | Krisbergh et al. | 379/56 |
| 5,201,067 | 4/1993 | Grube et al. | 455/89 |
| 5,221,152 | 6/1993 | Harte | 379/59 |
| 5,237,603 | 8/1993 | Yamagata et al. | 455/38.3 |
| 5,241,410 | 8/1993 | Streck et al. | 359/176 |
| 5,241,542 | 8/1993 | Natarajan et al. | 455/343 |
| 5,301,225 | 4/1994 | Suzuki et al. . | |
| 5,343,319 | 8/1994 | Moore | 359/152 |
| 5,381,133 | 1/1995 | Erhart et al. | 455/343 |
| 5,420,911 | 5/1995 | Dahlin et al. | 379/59 |
| 5,446,783 | 8/1995 | May | 379/59 |
| 5,459,457 | 10/1995 | Sharpe | 455/343 |
| 5,465,392 | 11/1995 | Baptist et al. | 455/343 |
| 5,522,046 | 5/1996 | McMillen et al. | 399/200.15 |
| 5,537,463 | 7/1996 | Escobrsa et al. | 379/102 |
| 5,600,471 | 2/1997 | Hirohashi et al. | 359/152 |

FOREIGN PATENT DOCUMENTS

| | | |
|---|---|---|
| 522631A2 | 1/1993 | European Pat. Off. . |
| 601820A1 | 6/1994 | European Pat. Off. . |
| 90/10360 | 9/1990 | WIPO . |
| 91/10292 | 7/1991 | WIPO . |
| 94/13111 | 6/1994 | WIPO . |

OTHER PUBLICATIONS

Infrared Data Association; Serial Infrared (SIR), Physical Lay Link Specification, Version 1.0, Apr. 27, 1994; Hewlett–Packard Company.

*Primary Examiner*—Rafael Bacares
*Attorney, Agent, or Firm*—Randall S. Vaas

[57] ABSTRACT

An infrared channel includes an IR transmitter circuit (302) and an IR receiver circuit (304). The transmitter circuit encodes data packets (400) which include a precursor segment, a synchronization segment, and a data field, the data field including data words, which words are bytes of data encoded by adding ones complement data bits and interleaving data subfields. The data fields are for infrared emission by the light source. A receiver circuit processor (316 or 508) is coupled to input samples to detect the presence of a precursor during a predetermined time period, and sleeping for a time interval, between inputting samples, which is substantially longer than the predetermined time period. The transmitter circuit transmits the precursor for a period of time at least as long as the sleep interval.

2 Claims, 6 Drawing Sheets

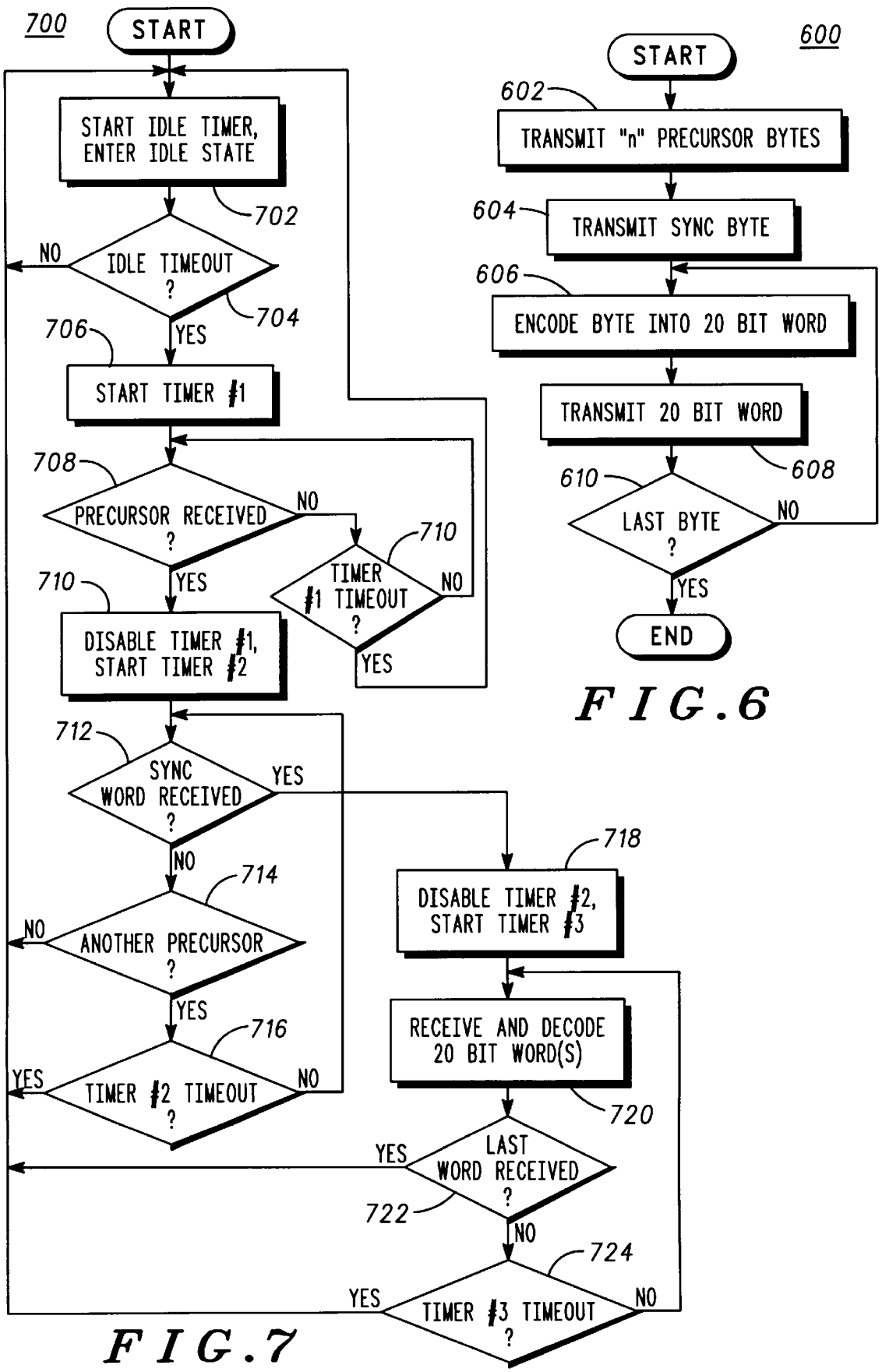

APPARATUS FOR INFRARED CHANNEL AND METHOD THEREFOR

FIELD OF THE INVENTION

The present invention pertains to optical communication, and more particularly to infrared communication.

BACKGROUND OF THE INVENTION

It is desirable to provide low current drain wireless communication means to facilitate information transfer, particularly in battery powered devices. Alternating current (AC) coupled, direct detection receivers are employed to implement optical wireless communication. Such receivers are very attractive in low current wireless data communications due to their simplicity and low cost. However, full swing noise present at the output of these receivers in the absence of received data impedes their utility.

In systems that employ a serial data format, the receiver may translate noise into false characters. In order for most systems to operate properly under noisy conditions, the danger of translating noise into data at the output of the receiver must be eliminated. There are two known methods of achieving this. One method uses hardware to "squelch" the receiver output in the presence of noise using a gate at the output of the receiver. Another method employs a software protocol to desense the system to noise.

A difficulty encountered when implementing a squelch circuit is avoiding a reduction in receiver sensitivity while gating the receiver output. By giving the squelch enough margin (such as hysterisis) to distinguish between data and noise, and to avoid "chattering" at weak signal levels, receiver sensitivity is reduced by selecting a compromise level at which squelching occurs. In low current systems, this degradation in the receiver sensitivity can not be accommodated, as no compromise level is available at which squelching can be provided without also removing data. Another problem encountered is accommodating the complexity of the squelch circuitry suitable for wireless infrared communications. In order for the squelch circuit to operate properly, it must be insensitive to the various light sources which are the main source of interference in wireless IR systems. Designing a robust squelch circuit to satisfy these requirements can be difficult and adds significantly to the cost and current demand of an otherwise simple, inexpensive, and low current receiver design.

A second method of preventing the translation of noise to data relies on a software protocol. This approach does not compromise the receiver sensitivity and avoids the additional cost and current demand of squelch circuits. Known protocols overcome the effects of noise by looking for specific data format. If random noise is encountered, the protocol is capable of recognizing the presence of such noise and responding to it accordingly. However known data formats are not well suited to implementation in low power, battery operated devices. The InfraRed Data Association (IrDA) serial communications link uses a Universal Asynchronous Receiver/Transmitter (UART) device. However, the IrDA specification requires additional circuitry to generate the IrDA signal format compatible with the UART device. Further, the IrDA specification requires that the receiving apparatus continuously monitor the infrared link for incoming data.

BRIEF DESCRIPTION OF THE DRAWINGS

FIG. 6 is a flow chart illustrating a operation of the transmitter processor;

FIG. 7 is a flow chart illustrating operation of the receiver processor;

DETAILED DESCRIPTION OF THE DRAWINGS

The disclosed protocol is based on the Serial data format with one start bit, one stop bit, and 8 data bits. The protocol provides asynchronous communications between devices, thus eliminating the need for clock recovery which further simplifies the receiver structure and reduces its current demand. The protocol is programmed to wake up for a predetermined period of time and look for valid bits. If valid bits are not detected within this predetermined time period, the receiver is turned off until the next wake up period. The invention does not require additional circuitry to perform formatting, since a data packet including robust data is generated using general purpose processor circuitry that may also be used to provide operations other than infrared data transmission. Additionally the invention provides an idle interval, referred to herein as "sleep mode", in which the receiving apparatus ignores data detected by the infrared (IR) data link. Accordingly the average receiver current for the IR data channel is significantly reduced to conserve processing resources and current drain.

The present invention may be employed in any device, and will be particularly advantageous in battery powered portable devices such as radios, pagers, radiotelephones, cellular telephones, personal digital assistants (PDA), laptop computers or the like. Accordingly, "device" as used herein refers to all such equipment and their equivalents.

Figure 1:
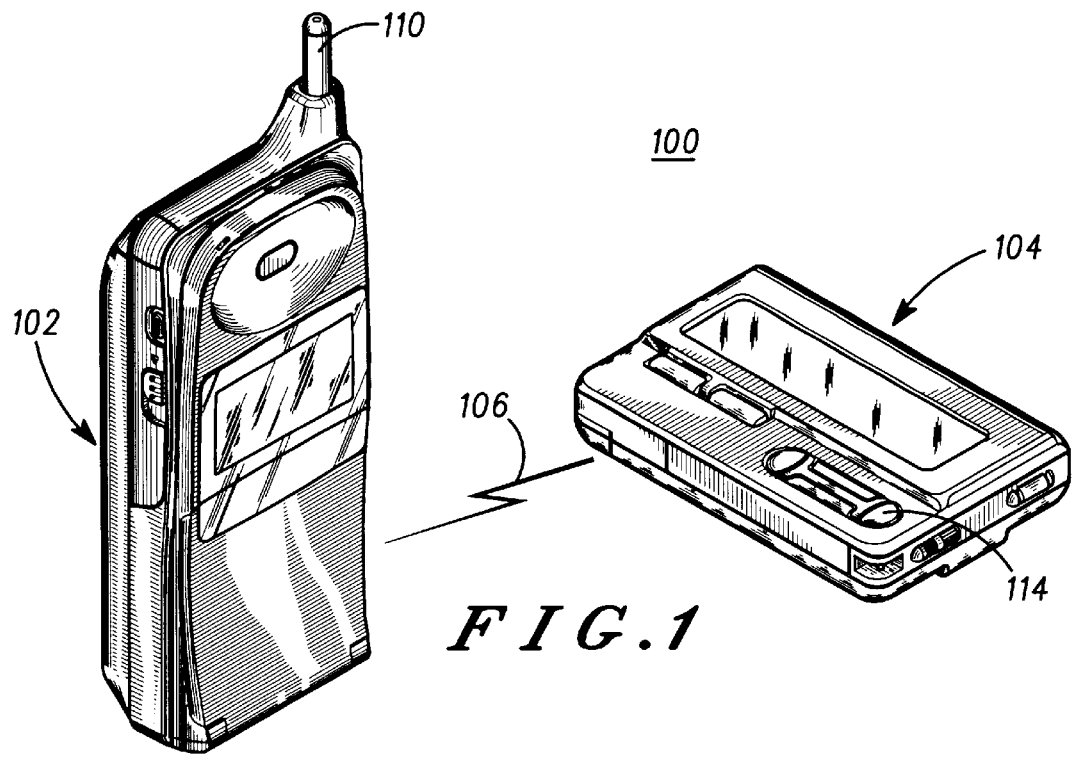
FIG. 1 is a perspective view illustrating a system including a radiotelephone and a pager.

A system 100 that advantageously employs the present invention is illustrated in FIG. 1. The system 100 includes a radiotelephone 102 and a pager 104. The radiotelephone 102 is equipped with an infrared receiver (not specifically shown in FIG. 1) and the pager 104 includes a an infrared transmitter (not shown in FIG. 1) which form an IR data link 106 used to communicate infrared emissions to radiotelephone 102 from pager 104. For example, a telephone number received by pager 104 in a page can be transferred to the radiotelephone 102 via the IR data link 106 for subsequent use in calling that number without the user having to manually dial the number.

Figure 2:
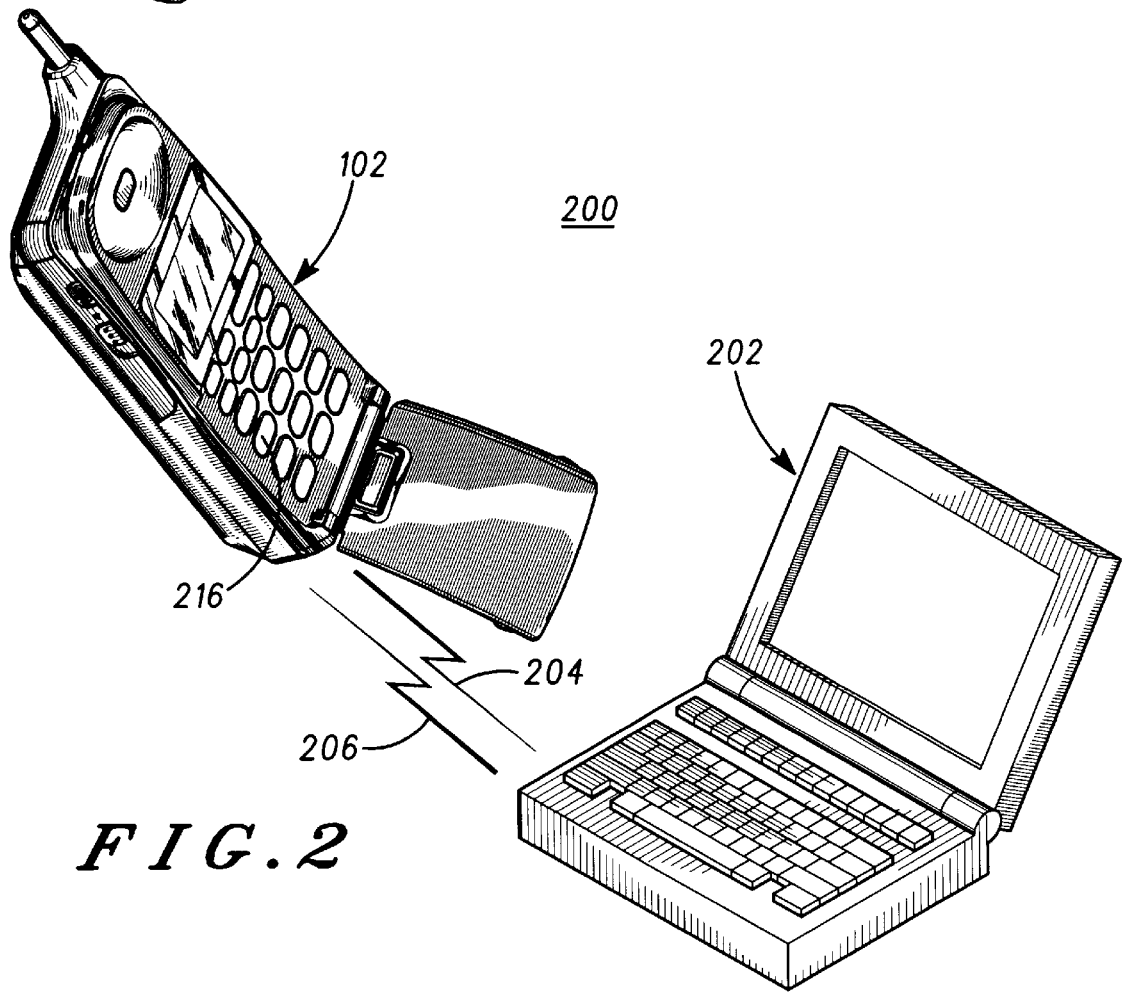
FIG. 2 is a perspective view of a system including a radiotelephone and a PDA.

Another system 200 (FIG. 2) includes radiotelephone 102 and a PDA 202. Two IR data links exist in this system. IR data link 204 permits transmission of data from cellular radiotelephone 102 to PDA 202. PDA 202 may use this information to update a data base of telephone numbers in the PDA or to display an electronic-mail (E-mail) message received by the radiotelephone 102 on the display 208 of PDA 202. The IR data link 206 is employed to transmit information form PDA 202 to cellular radiotelephone 102. Such information may include E-mail messages generated in PDA 202 to be transmitted in a cellular transmission by radiotelephone 102 or alphanumeric information entered using the larger keyboard of PDA 202 for use in the radiotelephone 102.

An IR data link 300 (FIG. 3), used for IR data links 106 (illustrated in FIG. 1), 204 (illustrated in FIG. 2) and 206, includes an IR transmitter circuit 302 (FIG. 3) and an IR receiver circuit 304. A transmitter processor 306 in transmitter circuit 302 assembles data into a formatted data packet, which is sent sequentially to the transmit amplifier 308. The transmit amplifier 308 amplifies the signal and sends the amplified, formatted data packet to an infrared light emitting diode (LED), or light source, 310 for transmission. The formatted data packet is emitted as infrared light from light source 310.

The IR receiver circuit 304 includes a photodiode detector 312 which detects IR emissions, as well as background noise such as that emitted from fluorescent light sources. A filter 313 is connected to the photodiode detector to filter out noise, and is preferably a highpass filter filtering all signals below a predetermined frequency, such as 1800 Hz. A receiver amplifier 314 is connected to the filter to amplify the signal output by filter 313. The amplified, filtered data is a binary data stream input to a receiver processor 316. The receiver processor samples, analyzes and decodes the received data.

The formatted data packet 400 (FIG. 4) that is generated by transmitter processor 306 includes four segments. A repeated precursor segment includes a short precursor bit sequence which is repeated enough times to cover a time period of at least 0.25 seconds. The Precursor preferably consists of a 10 bit "0000011111" sequence transmitted before the synchronize segment to synchronize the receiving device, and which synchronize segment signals the start of the data field.

The number of bytes in the precursor is a function of the desired receiver sleep time. An expression for the sleep time is shown below:

$$t_{sleep} = 10(n-2)/Baud,$$

where:

n is the number of bytes (n≧2)

Baud is the bit rate in bits per second (bps).

$t_{sleep}$ is equal to the desired sleep time interval in seconds

In the current implementation "n" is set to 500. The sleep time is programmed for a duration of 498 frame-periods. This allows power to the IR receiver (controlled by the receiver processor) to be disabled during the sleep period in order to conserve power, or for the processor to perform other functions during this "sleep period." In this manner, a separate processor is not required to implement the IR receiver, which is particularly advantageous in devices such as radiotelephone 102 and pager 104, which are relatively small in space and have limited battery capacity.

The precursor is followed by a synchronize segment. The synchronize segment preferably includes an 8 bit sequence "01101010" transmitted following the precursor, a start bit and a stop bit. After adding the start/stop bits to the eight synchronize bits, the synchronize segment frame becomes "0011010101". The data length segment with the synchronize segment identifies the end of a data field that follows the data length segment.

Figure 4:
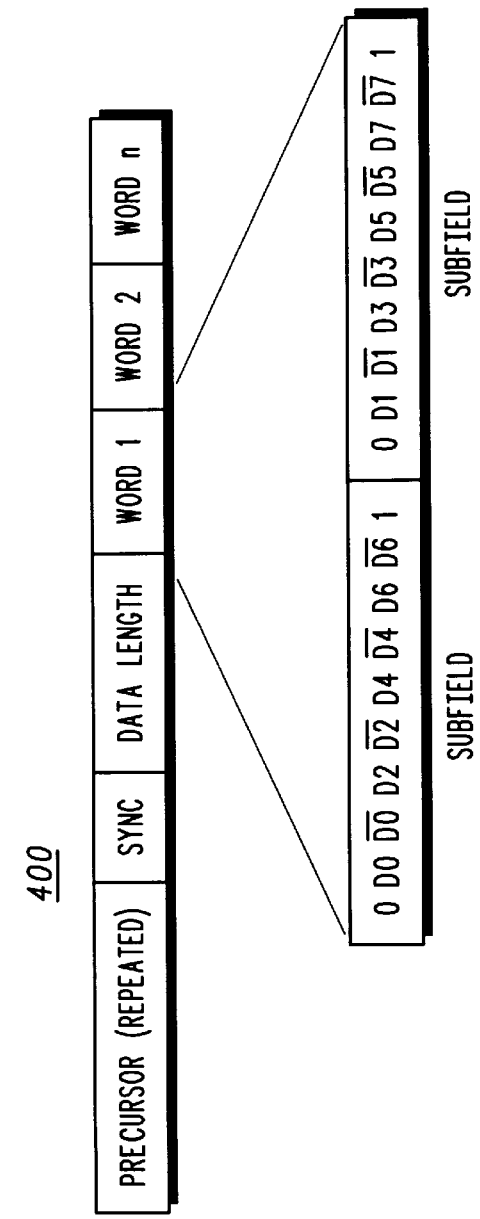
FIG. 4 illustrates a data packet.

The data field has data words conveying the information to be communicated. In this encoding scheme, each 8 bit data byte to be transmitted in the data field is expanded, encoded, into two 10 bit subfields to produce a 20 bit word. Each sub-field contains a start bit, four data bits and their compliments, and a stop bit. As illustrated in FIG. 4, which shows a data packet, each data word includes two data subfields. Each data subfield includes a leading bit and a trailing bit. The leading and trailing bits preferably have opposite values (0 and 1 in the illustrated code). Each bit of the word is encoded into a data pair comprising the bit and its ones complement positioned side-by-side (i.e., the actual state of each bit is next to its inverse state (for example, bit zero, D0, is next to the inverse of bit zero). Sequential bit pairs are interleaved, such that sequential bits do not appear in the same subfield (for example, bit zero and its compliment are in one subfield and bit one and its compliment are in the next subfield). This two-to-one encoding scheme in the data field eliminates any portion of the data that would otherwise produce low frequency (below 2000 Hz) content of the data on the IR channel, which low frequency content is very susceptible to light interference. Those skilled in the art will recognize that this encoding scheme effectively doubles the bit rate of the channel for a given throughput rate of data.

The data transmitted by the IR LED (light source 310) represents ones and zeros. Ones may be represented by a positive value or a zero level without detrimentally effecting the performance of this infrared channel.

Figure 8:
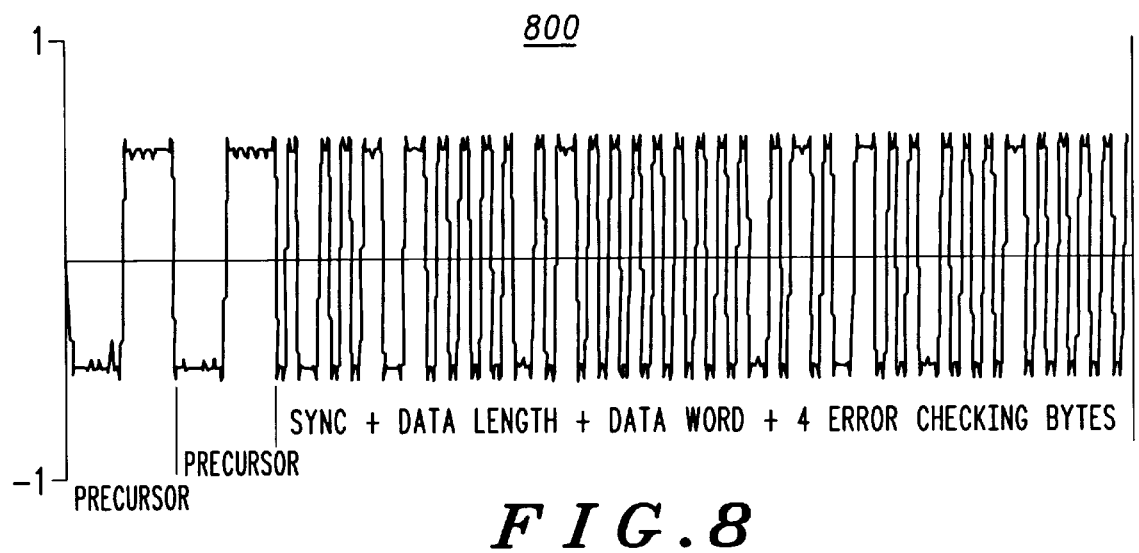
FIG. 8 illustrates a simulated data packet.
Figure 9:
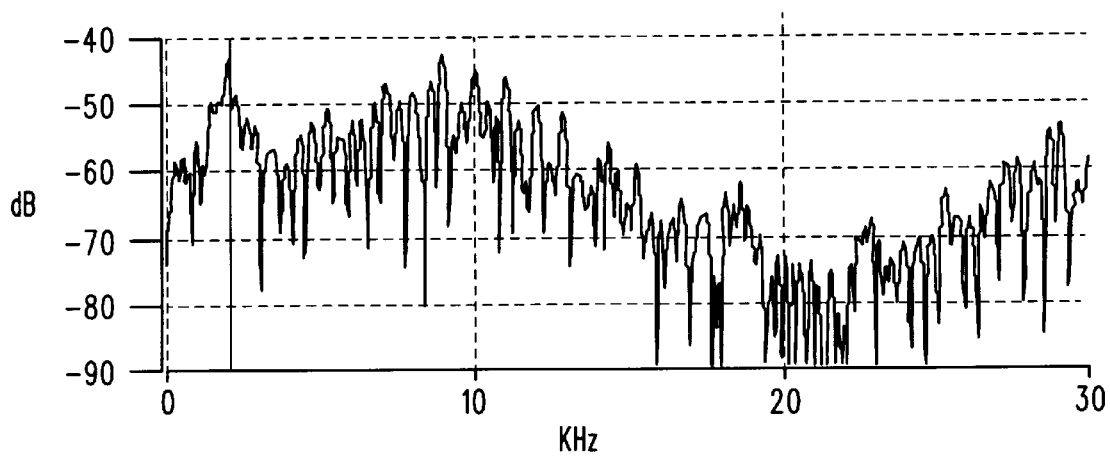
FIG. 9 illustrates a frequency spectrum of the simulated data packet.
Figure 10:
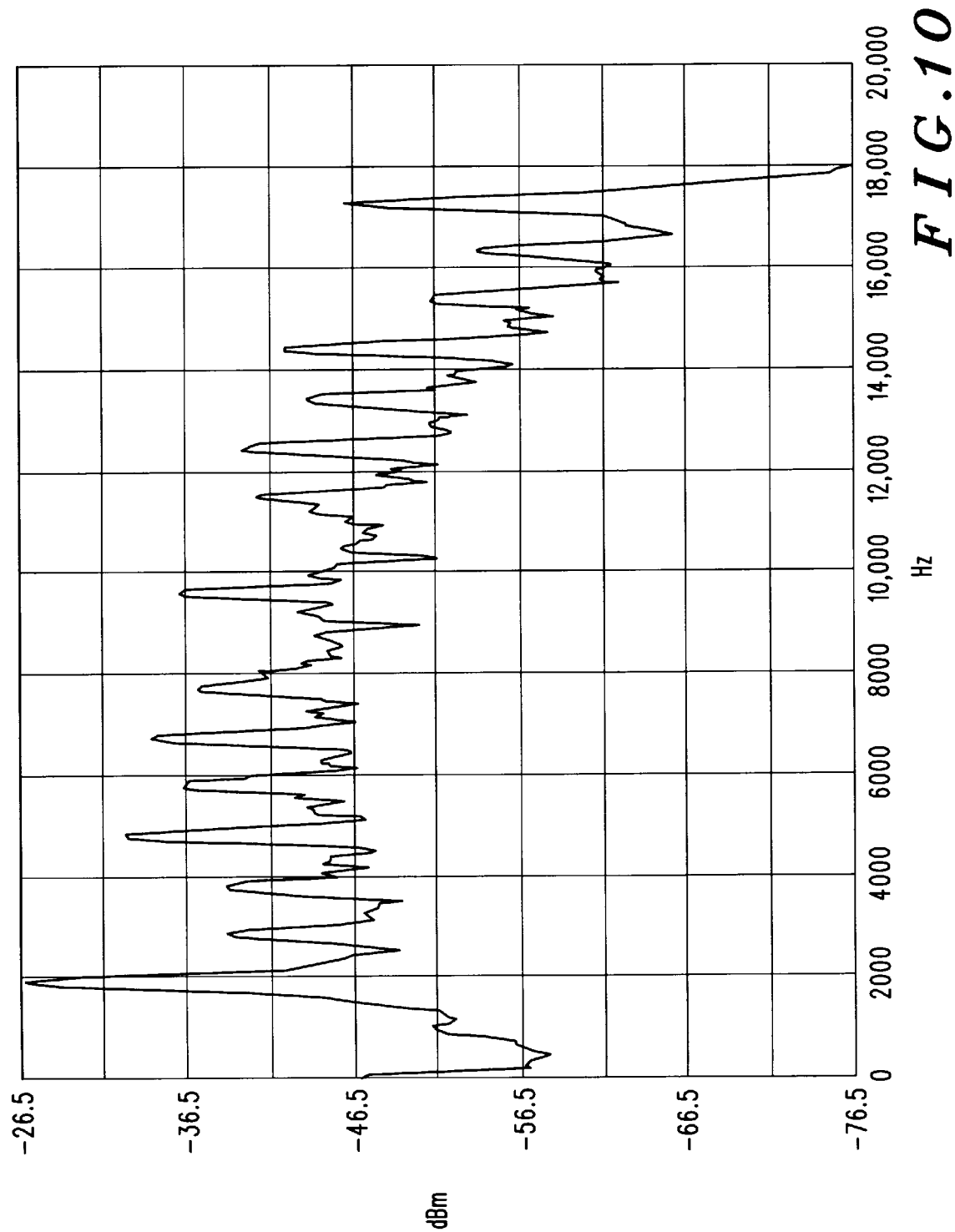
FIG. 10 illustrates a frequency spectrum of empirical data from an actual data packet.

Lab tests were conducted to verify the performance of the immediate signal format. These lab test results are represented by the simulated graphs in FIGS. 8 and 9. A simulated data transmission packet 800 is illustrated in FIG. 8, which is a graph of bit position to value. This data is limited in that it includes only two precursors, although more precursors would typically be employed. The precursors are followed by a series of bits including the synchronize segment, the data field length segment, the data frame segment, and four error checking bytes. Again, the simulated data is limited in that it only includes only one data word, although larger data words would typically be transmitted. The simulation used a 20,000 baud rate. The simulated spectrum for this packet 800 signals is illustrated in FIG. 9. The spectrum includes a spike at 2000 Hz, which is the precursor spectrum. The data spectrum extends upwardly form 2000 Hz to approximately 20 KHz. The data spectrum for an actual data packet is illustrated in FIG. 10. The large spike is seen at 2000 Hz. The spike on the far left side of the spectrum print out is an error caused by the equipment used to generate the spectrum.

The characteristic of the spectrum allows the use of a low pass filter, 313, having a cut-off frequency below 2000 Hz, to remove noise. For example, a filter having a cut-off frequency (3 dB roll-off) at 1800 Hz may be used to remove noise below the spectrum of the received signal. This allows a wide-band wireless IR receiver to be subjected to various incandescent and Fluorescent light sources which have a significant noise level starting at DC and continuing up to approximately 1.5 Khz, without effecting the performance of the IR receiver. The data present at a frequency near 2 Khz is passed while the filter 313 removes the noise below this frequency. In this manner, low level noise signals which would otherwise produce false data are eliminated, and the low level data which is received form the transmitter is input to the processor.

Figure 5:
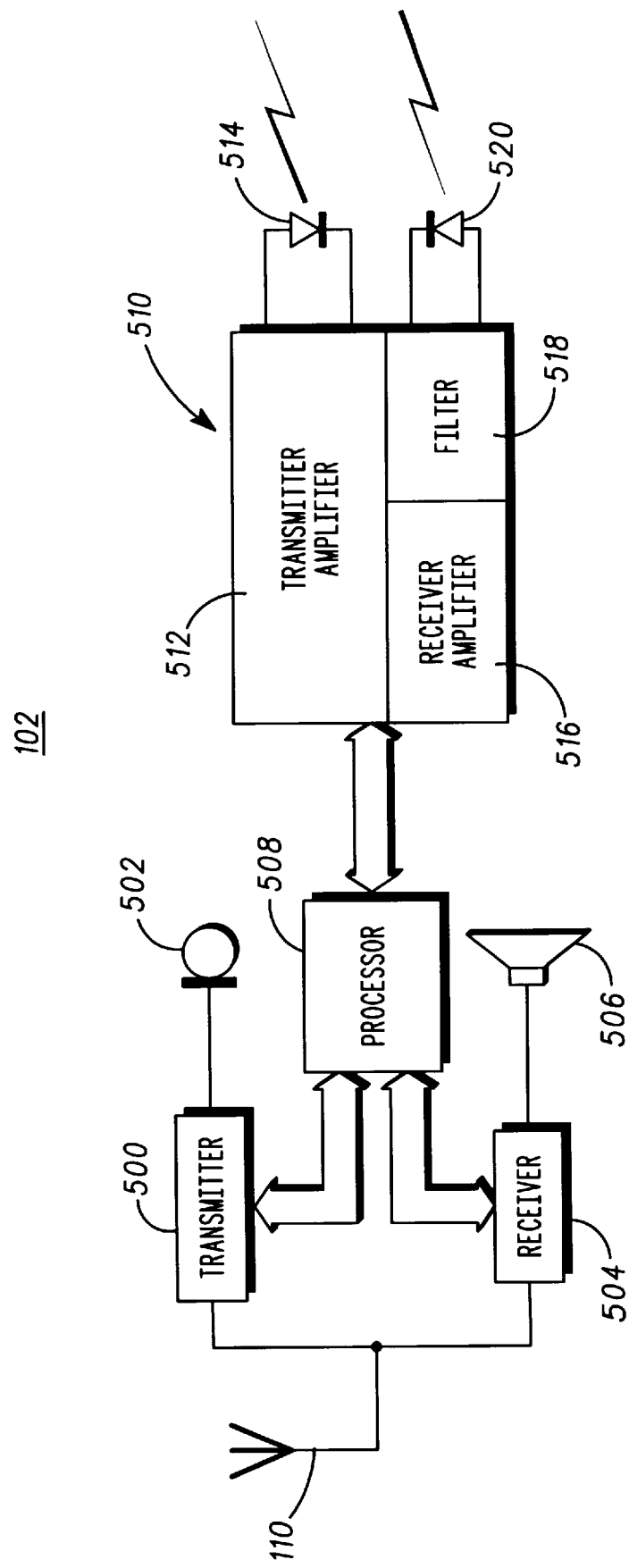
FIG. 5 is a circuit schematic illustrating a radiotelephone.

A cellular radiotelephone 102 incorporating the present invention is disclosed in FIG. 5. The cellular radiotelephone 102 includes a radio frequency (RF) transmitter 500 generating signals to be transmitted via antenna 110 from signals output by microphone 502. A receiver 504 generates signals that drive speaker 506 responsive to signals received on antenna 110. The transmitter and receiver operate under the control of processor 508, in a conventional manner, which will not be disclosed in greater detail herein for brevity.

Figure 3:
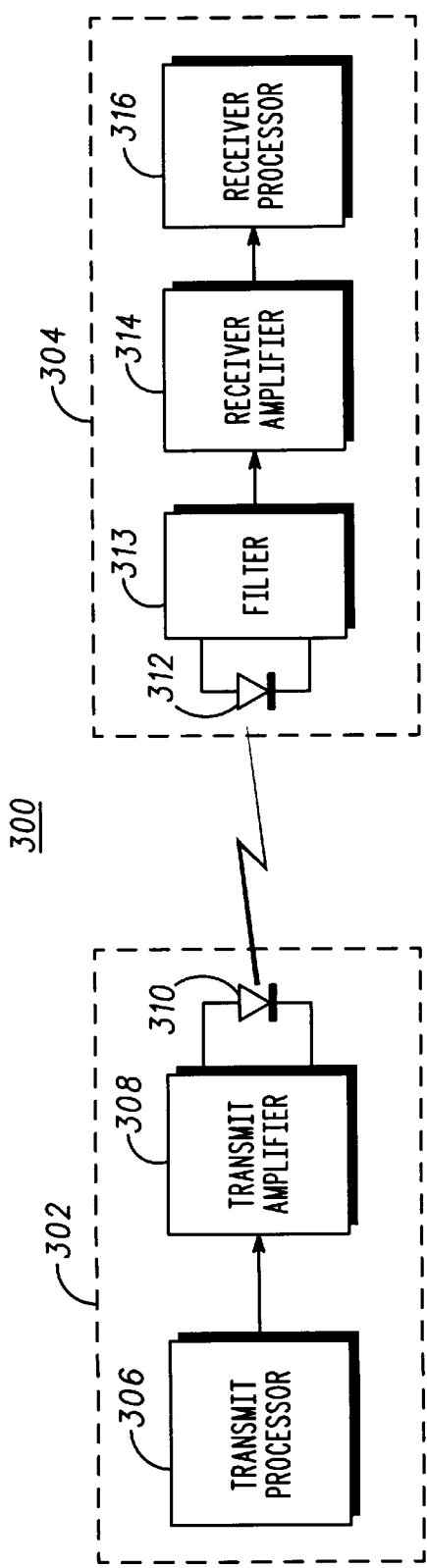
FIG. 3 is a circuit schematic in block diagram form illustrating a data link.

The processor 508 is also connected to an IR circuit 510. The IR circuit 510 includes an amplifier 512 connected to transmission diode 514. The circuit also includes a receiving amplifier 515, a filter 518 and a receiving diode 520. The processor 508, utilized for control of the cellular radiotelephone 102, provides the transmitter processor and receiver processor operation of the IR data link 300 (FIG. 3). The "sleep mode" of the IR protocol according to the immediate invention allows the processor 508 already existing in the radiotelephone to provide IR signal operation, without additional processor circuitry. The Immediate invention may be performed using general purpose microcontrollers, such as integrated circuit number HC-11 commercially available form Motorola, Inc.

The operation of the IR receiver and the IR transmitter will now be described with reference to FIGS. 6 and 7. The transmitter processor 306 (FIG. 3 or Processor 508 in the radiotelephone of FIG. 5) begins the transmission function following activation of a control switch (114 in the pager or 216 in the radiotelephone 102) by the user. The actuation of the control switch results in interruption of a main operating program (not described), and initiation of subroutine 600. The transmitter processor initially sequentially outputs a serial stream of precursor bytes, repeated for a time period greater than the sleep period of the receiver, as indicated in block 602. Because the precursor is transmitted for a time period exceeding the sleep time, the user need not hold down the actuation switch until the procures is detected. This is particularly important where the user does not receive visual or audible confirmation the communication has been achieved (i.e., a user of a remote control holds a button down until the channel changes, or the volume changes, which is a confirmation of receipt,; such confirmation is not always available where data is communicated between devices). The processor then transmits the synchronize segment, with a data field length computed for the data bytes to be transmitted in their encoded format, as indicated in block 604. The processor then encodes a byte into a 20 bit word (block 606), transmits the 20 bit word (block 608). The processor will continue to transmit words until all the bytes are transmitted, as determined at decision block 610. When the transmissions concluded, the processor returns to the main routine (not shown) which was interrupted.

The operation of the receiver will now be described with reference to the subroutine 700 illustrated in FIG. 7. The receiver processor 316 (or processor 508 in radiotelephone 102) starts the idle timer, or IR sleep timer, which has a time period set to a predetermined time interval during which sampling for IR precursor detection does not occur, as indicated in block 702. The IR sleep may for example be 0.25 second. At the conclusion of the IR idle state time period, as determined in decision block 704, the processor starts a timer number 1, as indicated in block 706. The processor will wait for receipt of the precursor, indicated by decision block 708, or for timer number 1 to time out, as indicated in decision block 710. Timer number 1 is a predetermined time period during which the received data will be sampled to detect the precursor, and is preferably substantially shorter than the predetermined time interval during IR sleep state, and may for example be a 0.001 second timer. If timer number 1 times out before the precursor is detected, the processor returns to the IR idle state at block 702. If the precursor is detected in decision block 708, the processor disables timer number 1 and starts timer number 2. The processor will then wait for the synchronize segment to be received, determined in decision block 712, or a second precursor to be detected, determined in decision block 714, before timer number 2 times out, determined in decision block 716. If a second valid precursor is detected in decision block 714 before timer number 2 times out, the processor returns to decision block 712. If the synchronize word is received, as determined at decision block 712, indicating a valid start of a data packet, timer number 2 is disabled and timer number 3 is initiated, as indicated in block 718. At this time, the processor will use the length of data field segment information to determine how many words are to be received in the data field. The processor then receives and decodes 20 bit words one at a time, in block 720, until the last 20 bit word is received, as determined in decision block 722. The processor then returns to the idle state.

If an invalid precursor is detected before a synchronize pulse, as determined at decision block 714, the processor detects an invalid data packet and returns to the idle state timer. Additionally, if timer number 2 or timer number 3 times out, invalid data packet is detected. Timer number 2 is set to the length of the time required to transmit the entire precursor. Timer number 3 is set to a predetermined length of time which is the longest length of time that a data field will be allowed to be transmitted (that is the maximum length of time allowed for the data field at the baud rate).

The present invention provides a robust IR data link which operates reliably even when communicating at low energy levels. Additionally, the protocol drains little power, such that the protocol is particularly well adapted for portable battery powered devices, where energy conservation is particularly important, and which devices are likely to operate at signal levels close to background noise levels.

We claim:

1. An infrared channel, comprising:

a transmit circuit including a transmitter processor and a light source;

a receiver circuit including light detector and a receiver processor;

the receiver processor coupled to analyze data detected by the light detector for predetermined time periods to detect presence of a precursor, and the receiver processor entering an IR sleep state for predetermined time intervals between predetermined time periods, the predetermined time intervals being substantially longer than the predetermined time periods; and the transmitter processor transmitting the precursor for a period of time at least as long as the predetermined time interval of the IR sleep state.

2. The infrared channel as defined in claim 1, wherein the transmitter processor assembles data into data packets including a precursor segment, a synchronization segment, and a data field, the data field including ones complement interleaved data subfields for infrared emission by the light source.

* * * * *